United States Patent [19]

Miller

[11] Patent Number: 5,127,701
[45] Date of Patent: Jul. 7, 1992

[54] SHELL FOR BED OF PICKUP TRUCK

[76] Inventor: Kevin Miller, 242 W. Skyline, Ballwin, Mo. 63011

[21] Appl. No.: 745,906

[22] Filed: Aug. 16, 1991

[51] Int. Cl.$^5$ ............................................. B60P 7/02
[52] U.S. Cl. ..................................................... 296/100
[58] Field of Search ....................... 296/100, 156, 216; D12/156; 135/88

[56] References Cited

U.S. PATENT DOCUMENTS

| D. 294,242 | 2/1988 | O'Neii ............................... D12/156 |
| 4,335,916 | 6/1982 | Gutgsell ............................. 296/156 |
| 4,496,184 | 1/1985 | Byrd et al. ......................... 296/100 |
| 4,526,416 | 7/1985 | Rode ................................... 296/100 |
| 4,828,315 | 5/1989 | Muirhead ........................... 296/100 |

Primary Examiner—Robert R. Song
Attorney, Agent, or Firm—Robbins & Robbins

[57] ABSTRACT

A shell for the bed of a pickup truck is provided. The shell is comprised of a base member mounted to the truck bed and a top member hinged to and fitted over the base member. The top member is hinged in such a manner that it may be swung open to allow access to the interior of the bed from the side as well as the rear of the truck. The hinge means have a quick release feature so that the top member may be removed for greater hauling capacity. A fabric covering may be substituted for the top member as an alternative cover.

12 Claims, 4 Drawing Sheets

SHELL FOR BED OF PICKUP TRUCK

BACKGROUND OF THE INVENTION

The present invention relates to truck tops or camper shells. Although there are many variations in the design of truck tops, almost all are of the type that open at the rear. One wishing to gain access to the truck bed would have to crawl in through the rear of the truck. This makes it inconvenient if an item to be retrieved is towards the front of the truck bed.

There also exist truck bed covers which pivot open and are connected towards the front of the bed; however, these covers are generally flush with the sidewalls of the truck bed and provide little storage capacity. Additionally, the top is not generally removable, and thus limits the amount and type of objects that can be loaded in the bed.

SUMMARY OF THE INVENTION

The instant invention of a shell for the bed of a pickup truck is comprised of a base, or bottom, piece and a top piece. The bottom piece forms the anterior portion of the shell and is comprised of front, top and side walls, and has a pair of rearwardly extending elongated support arms. The bottom piece is mounted on the top of the side walls of the truck bed. The top and side walls of the bottom piece extend only a relatively short distance down the length of the bed from the rear of the cab, but the support arms extend the entire length of the bed.

The top piece is comprised of top, side, and rear walls and is shaped to rest on the support arms and to abut the edge of the side walls of the bottom piece. The top piece is hingedly connected to the bottom piece so that it may be swung open. This enables the operator to gain access to the truck bed readily from any point about the truck bed, as opposed to having to enter the truck bed through the rear as with conventional truck tops.

A support arm brace may be provided between the top and bottom pieces to allow the top piece to be temporarily locked into the open position during loading of the truck bed or the like. The hinge connection between the top and bottom pieces may be of the quick release type so that the top piece may be removed, leaving only the bottom piece in place. This arrangement allows for greater height clearance towards the rear of the bed and enables the operator to haul or transport large bulky items such as refrigerators, furniture or other tall items.

Other embodiments of top pieces are also contemplated in this invention. A second top embodiment comprises a rigid member conforming to the contour of the bottom piece and lying substantially flat along the rear edge of the side walls and top edge of the bottom piece. It is also hingedly connected to the bottom piece like the top of the first embodiment.

A third top comprises a soft cover comprising a pliant material that is placed to lie flat over the exposed edges of the bottom piece and is secured thereon by snaps or Velcro ® or other suitable means. Alternatively, a raised support brace member may be installed on the bottom piece so that the soft cover is stretched over the brace member, giving the top a more angled appearance.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
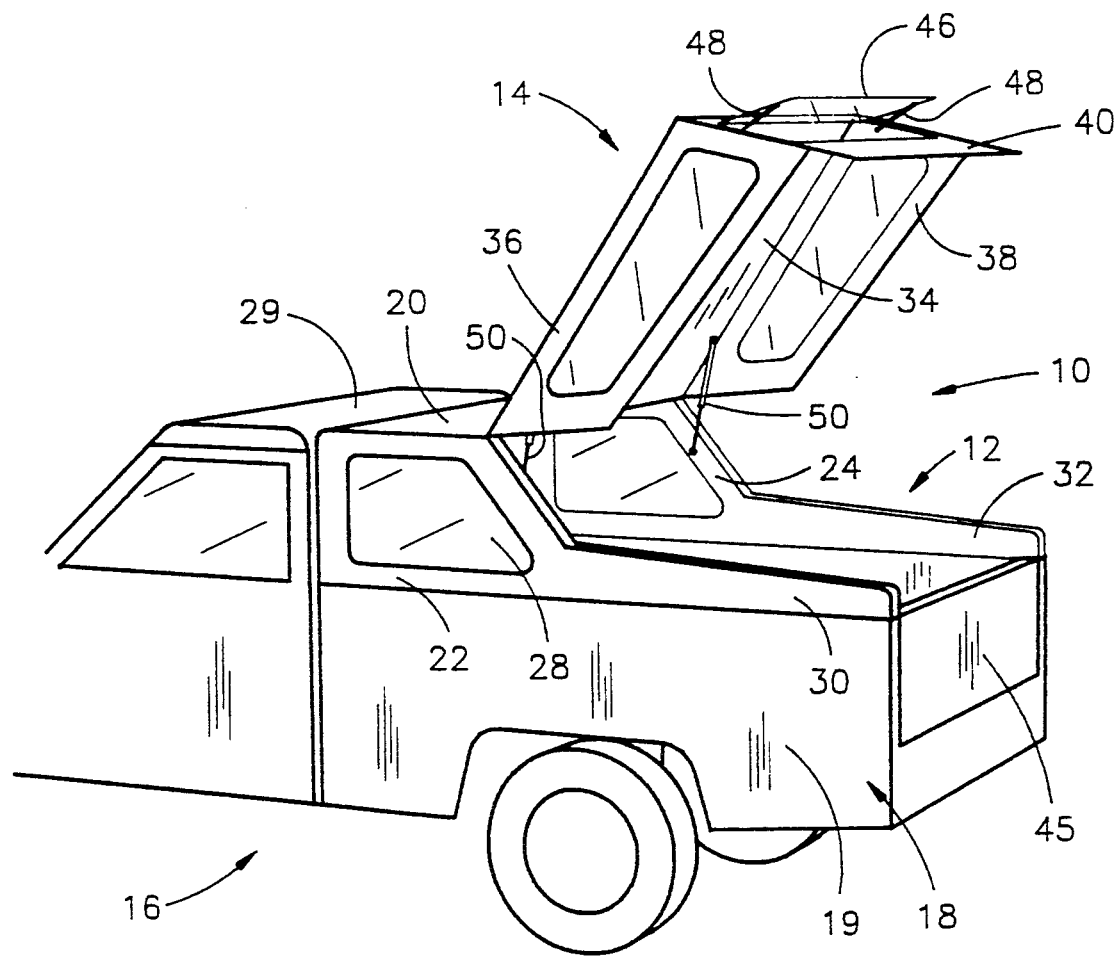
FIG. 1 is a perspective view of the truck top shell of the invention with the top section pivoted open.

The truck top shell of the instant invention is generally indicated by the reference numeral 10 and is comprised of a bottom section 12 and a top section 14. These sections are constructed of pre-molded fiberglass or plastic material, or alternatively, may be constructed by a support framework with suitable cover material such as fiberglass or plastic. The shell is designed to fit on a pickup truck 16 having a rear bed 18 and fender walls 19.

The bottom section 12 has a top side 20, lateral sides 22 and 24, and a front side 26 as seen in FIG. 1. Lateral sides 22 and 24 may optionally be provided with a window 28. Front side 26 may also be provided with a window, or just be provided with an open space to allow for communication and access through a rear window commonly provided in the cab 29 of the pickup truck.

Bottom section 12 also has a pair of elongated, rearwardly extending arms 30 and 32 which extend from lateral sides 22 and 24, respectively, and run the entire length of the bed. Arms 30 and 32, and the bottom edges of lateral sides 22 and 24, are supported on top of the side walls of the bed and are fastened thereto by bolt or other suitable means, while front side 26 is butted up against the rear of cab 29.

Figure 2:
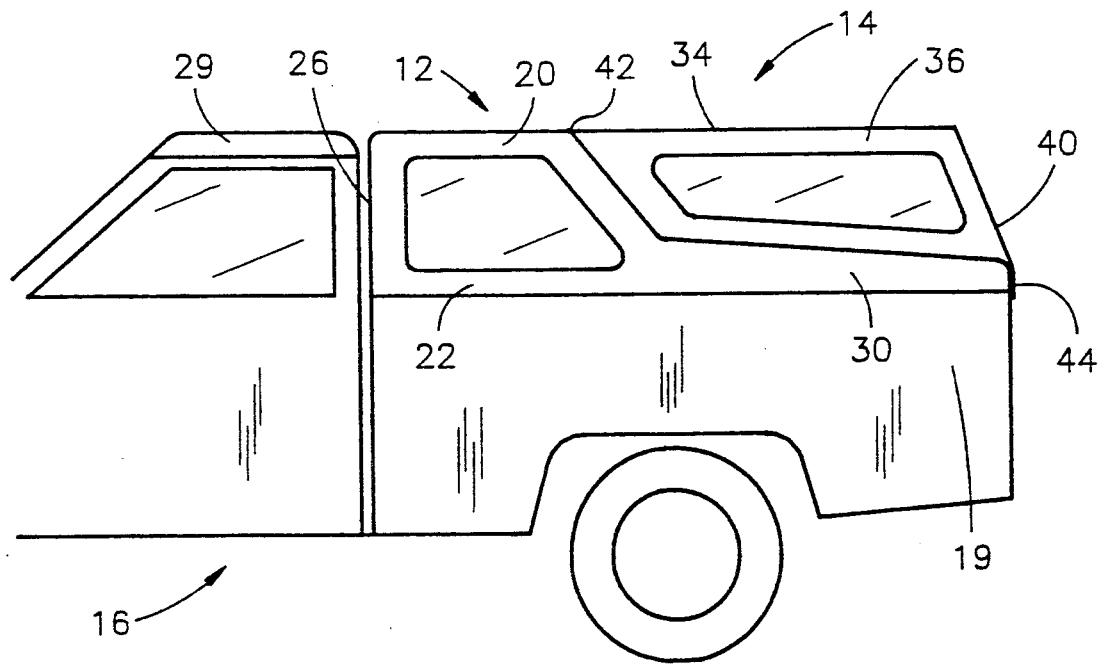
FIG. 2 is a view in side elevation from the side of the truck with the truck top shell closed.
Figure 3:
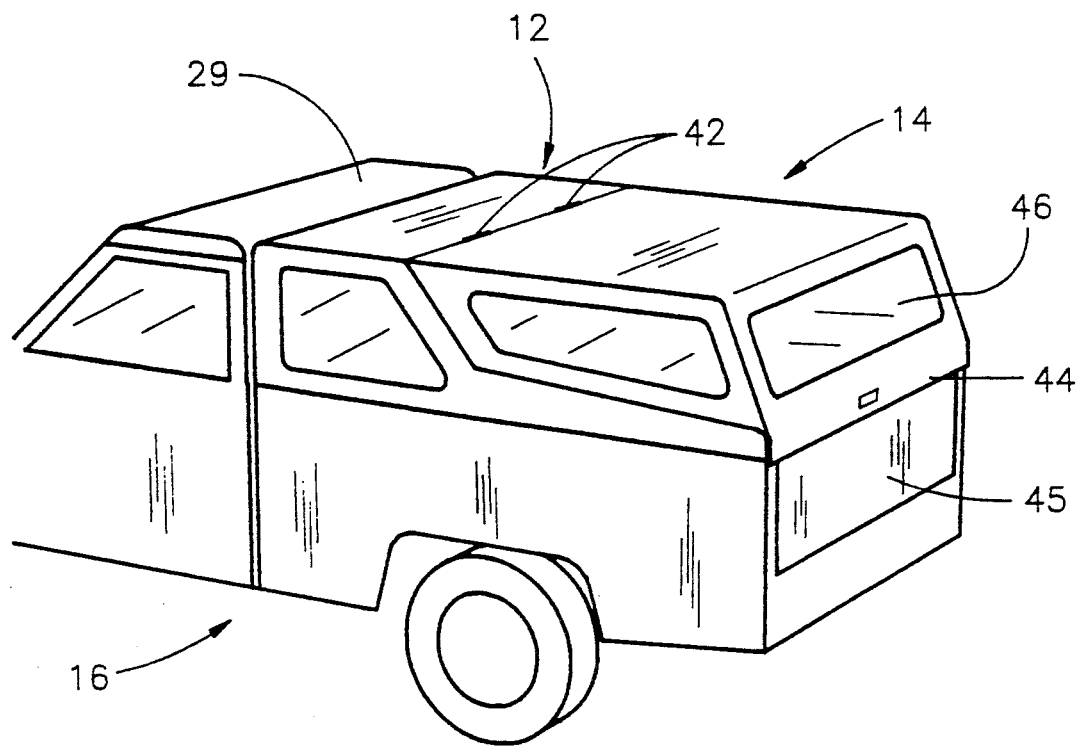
FIG. 3 is a perspective view of the truck top shell showing the hinge connection between the top and base sections.
Figure 4:
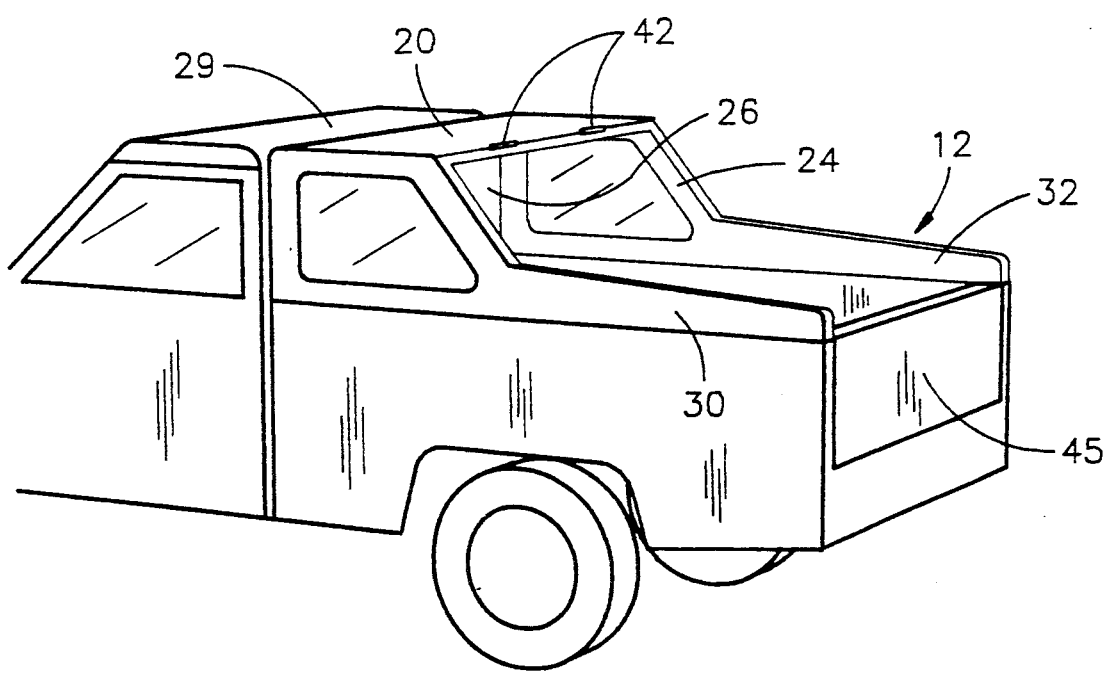
FIG. 4 is a perspective view with the top section removed.

Top section 14 is comprised of a top panel 34, lateral panels 36 and 38, and rear panel 40 as seen in FIG. 1. It is connected to bottom section 12 by hinges 42 as seen in FIG. 3. Lateral panels 36 and 38 have contoured edges for complementary abutment with lateral sides 22 and 24 and arms 30 and 32 of bottom section 12 when in a closed position as seen in FIG. 2. The hinge connection allows top section 14 to be swung into an open position as shown in FIG. 1. A pair of support struts 50, spanning between lateral panel 36 and lateral side 22 on one side, and lateral panel 38 and lateral side 22 on the other side, respectively, are provided to sustain top section 14 in an open position as shown in FIG. 1. Support struts 50 are biasedly extensible to prevent top section 14 from dropping too quickly when being closed. The support struts may be installed in such a fashion, such as by bolt or stud, to permit quick disengagement from lateral sides 22 and 24. Hinges 42 may be of a quick disconnect type, well known in the art, so that top section 14 may be completely removed from bottom section 12 as shown in FIG. 4.

Rear panel 40 of top section 14 has a bottom edge 44 which is contoured to lie in close proximity to the rear edges of arms 30 and 32 and meet or slightly overlap tailgate 45 when top section 14 is in the closed position as shown in FIG. 2. Although not shown, conventional latch and lock mechanisms may be provided to secure bottom edge 44 to arms 30 and 32. Rear panel 40 has a window 46 which may be adapted to be opened and closed as shown in FIG. 1. A pair of extendable struts 48 are provided to retain window 46 in an open position and also to prevent the window from banging shut too quickly when closing. Latch and lock mechanisms may also be employed for locking window 46, not shown.

Figure 7:
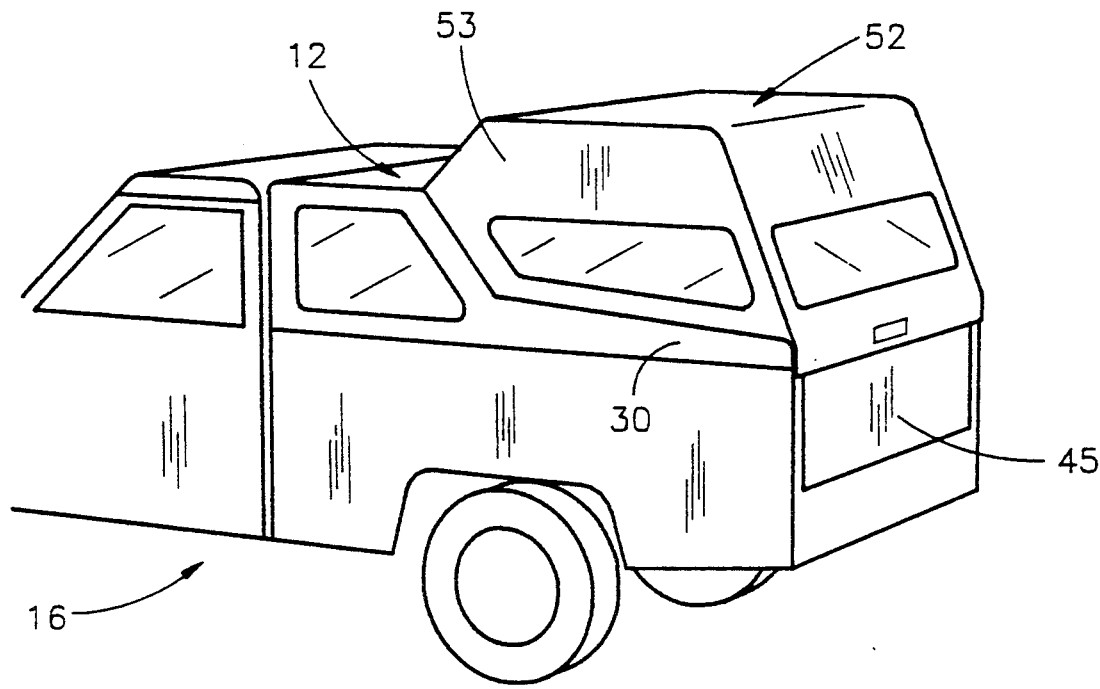
FIG. 7 is a perspective view of a fourth embodiment of the truck top shell.

Alternate top section 52 has extended lateral panels 53, shown in FIG. 7, which increases the height of the inner storage space within the shell.

Figure 5:
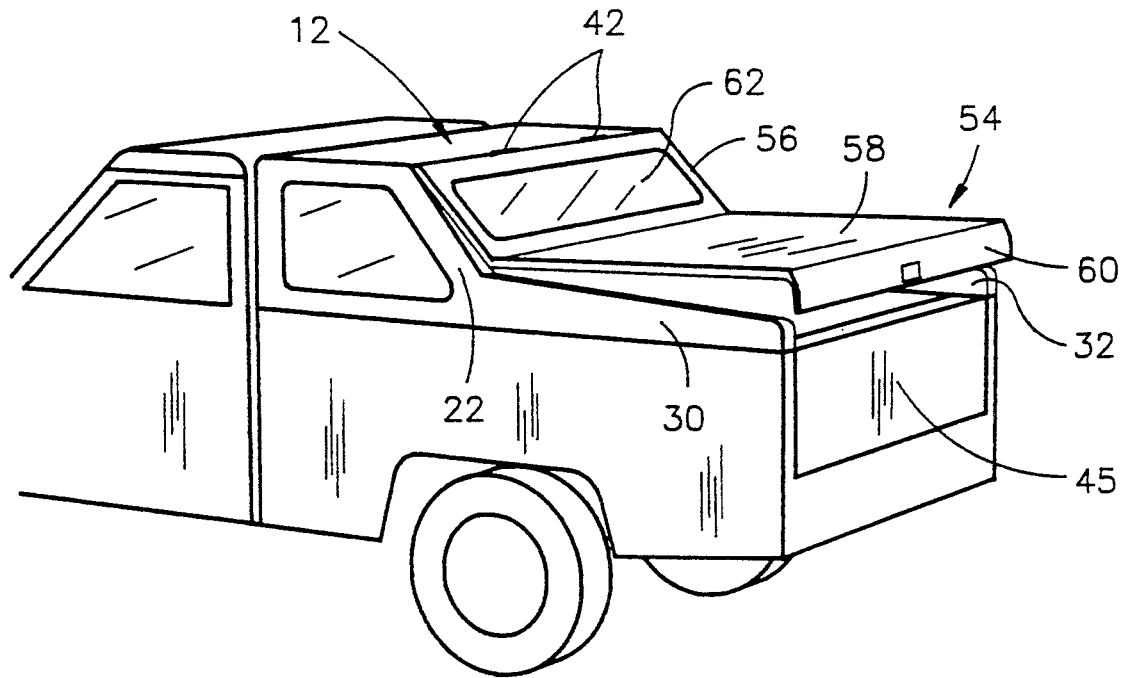
FIG. 5 is a perspective view of a second embodiment of the truck top shell.

Bottom section 12 is adapted to receive interchangeable top sections to create various functional and aesthetic effects. In FIG. 5, top cover 54 is attached to bottom section 12 by hinges 42. It is comprised of a rigid, integral piece having three sections preformed to approximate the contour of bottom section 12. In the closed position, forward section 56 abuts against lateral sides 22 and 24, middle section 58 is supported upon arms 30 and 32, and tail section 60 abuts against the rear edges of arms 30 and 32. Top section 54 moves integrally as a unit when placed in the open position, as seen in FIG. 5. Forward section 56 may be equipped with a window 62. Tail section 60 may be provided with a latch and lock mechanism for securing to arms 30 and 32, not shown.

Figure 6:
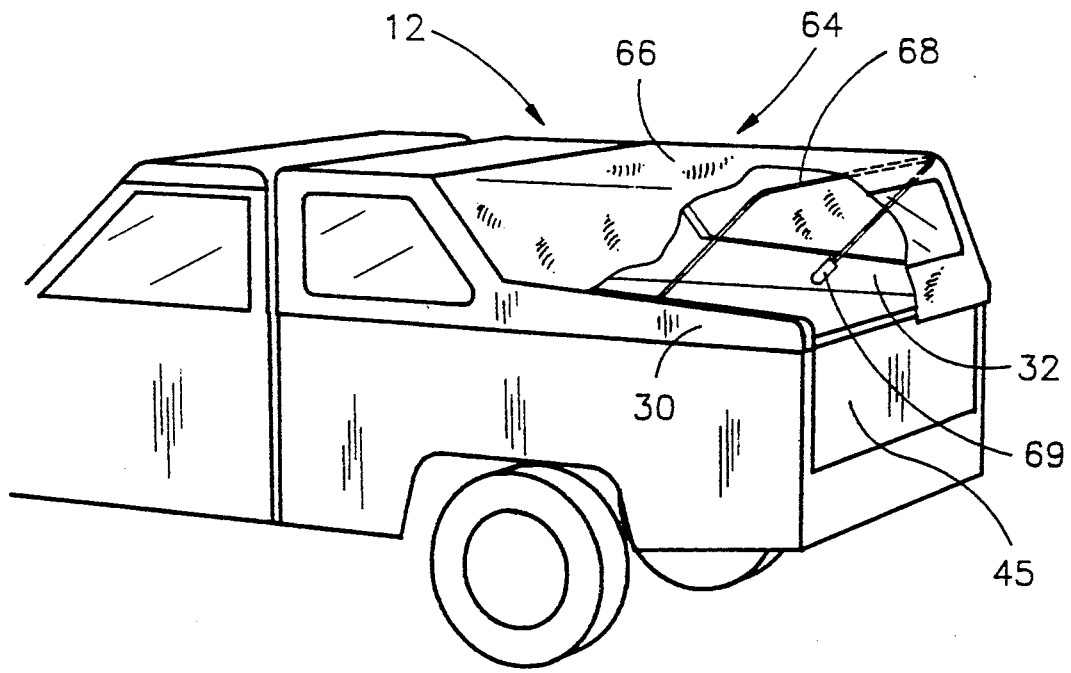
FIG. 6 is a perspective view of a third embodiment of the truck top shell with the top section partially removed to show the support brace.

Another top section 64 is shown in FIG. 6 and comprises a canvas, vinyl, or other suitable material, cover 66. It is pre-formed in a shell shape structure and receives support from bracket 68. The edges of cover 66 are secured to bottom section 12 by snaps, Velcro ® fastening, or the like for quick installation and removal. The snaps or Velcro ® strips can be mounted on the edges of bottom section 12 and arms 30 and 32 and the corresponding edges of top section 64. Bracket 68 is removable and is mounted in socket 69 on the interior of arms 30 and 32 as shown in FIG. 6. Top section 64 is mounted as an integral unit, but is not adapted to swing open.

Figure 8:
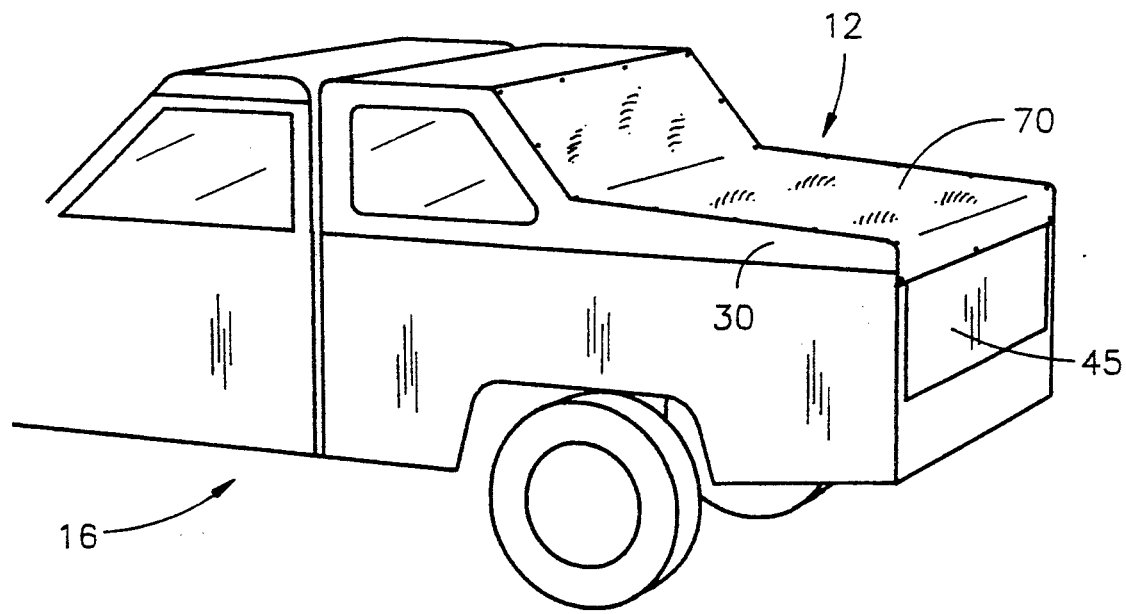
FIG. 8 is a perspective view of the bottom section of the shell with the top section replaced by a soft vinyl top.

FIG. 8 shows top cover 70 which is likewise constructed of vinyl or canvas. It is connected to bottom section 12 by snaps (as shown) or Velcro ® fastening for quick connect and disconnect. The snaps or Velcro ® strips would have to be installed on the tops of arms 30 and 32 and the rest of the edge of bottom section 12 before this top is used. Cover 70 is simply a utilitarian type cover which adds a sporty look to the otherwise uncovered bottom section 12.

The truck top shell of the instant invention provides a useful accessory for pickup trucks and enhances the overall design of the truck. The hinge connection between the bottom and top sections allows for a hatchback type opening and permits the user to have access to any point within the bed from the side as well as the rear of the truck. The quick disconnect feature enables the top section to be easily removed for more efficient use of bed space for increased hauling capacity. The universal bottom section permits interchanging of top sections for different style effects.

Various changes and modifications ma be made within this invention as will be apparent to those skilled in the art. Such changes and modifications are within the scope and teaching of this invention as defined in the claims appended hereto.

What is claimed is:

1. A shell for a bed of a pick-up truck, said shell being comprised of a bottom section and a top section, said bottom section having a front side, two lateral sides, a top side, and two elongated base support arms each extending rearwardly from a bottom rear corner of each of said lateral sides, said top section having a top panel, two lateral panels, and a rear panel, said bottom section being mounted on a top surface of a wall of said bed of said pick-up truck next to a cab portion of said pick-up truck, said lateral sides and said top side projecting over said bed a substantially shorter distance than a length of said bed, said top section being supported on said elongated base support arms, said bottom section having hinge means at a rear edge of said top side connecting said top section to said bottom section in pivoting relation, whereby said top section is maneuverable between open and closed positions with respect to said truck bed, allowing a person standing on the ground to have virtually unobstructed access to the interior of said bed from any side of said truck when said top section is in said open position.

2. The shell for a bed of a pick-up truck of claim 1 in which said hinged connection of said top section to said bottom section is disengagable, whereby said top section is removable.

3. The shell for a bed of a pick-up truck of claim 1 in which means are provided to support said top section in an open position, said means comprising a pair of extendable support arms, each of said support arms having one end connected to an interior portion of each said lateral sides of said bottom section and a second end connected to an interior portion of each of said lateral panels of said top section.

4. The shell for a bed of a pick-up truck of claim 2 in which means are provided to support said top section in an open position, said means comprising a pair of removable extendable support arms, each of said support arms having one end removably connected to an interior portion of each of said lateral sides of said bottom section and a second end connected to an interior portion of each of said lateral panels of said top section.

5. The shell for a bed of a pick-up truck of claim 1 in which said rear panel of said top section has means for engaging said elongated base support arms in locking relation whereby said top section is securely held on said bottom section in a closed position.

6. The shell for a bed of a pick-up truck of claim 1 in which said front side and said lateral sides of said bottom section and said lateral panels and said rear panel of said top section have areas defining openings, whereby said openings receive window panes.

7. The shell for a bed of a pick-up truck of claim 6 in which a window pane in said rear panel of said top section is hingedly connected to said rear panel, whereby said window pane is maneuverable between open and closed positions, said window pane having means at a lower edge for being secured to said rear panel in a closed position.

8. The shell for a bed of a pick-up truck of claim 7 in which means are provided to support said window pane in an open position, said means comprising a pair of extendable support rods, each of said support rods having one end connected to an interior portion of said window pane and a second end connected to an interior portion of said rear panel of said top section.

9. A shell for a bed of a pick-up truck, said shell having a front side, two lateral sides, a top side, and two elongated base support arms each extending rearwardly from a bottom rear corner of each of said lateral sides, said shell being mounted on a top surface of a wall of said bed of said pick-up truck next to a cab portion of said pick-up truck, said lateral sides and said top side projecting over said bed a substantially shorter distance than a length of said bed, said shell having means for receiving a top cover, said top cover lying substantially flush along a back edge of each of said lateral sides and along a top edge of each of said base support arms, allowing a person standing on the ground to have virtually unobstructed access to the interior of said bed from any side of said truck when said top section is in said open position.

10. The shell for a bed of a pick-up truck of claim 9 in which said top cover is rigid, said shell having means whereby said top cover is hingedly connected to said shell, said means comprising hinges positioned at a rear edge of said top side of said shell and engaging said top cover at a front edge thereof, said hinges being quickly releasable.

11. The shell for a bed of a pick-up truck of claim 9 in which said top cover is comprised of a pliant material, said top cover having means for being securely fastened to said shell.

12. A shell for a bed of a pick-up truck, said shell being comprised of a bottom section, said bottom section having a front side, two lateral sides, a top side, and two elongated base support arms extending rearwardly from said lateral sides, said base support arms extending rearwardly a substantial distance further than said top side, whereby said bottom section is uncovered for a substantial distance, said bottom section being mounted on a top surface of a wall of said bed of said pick-up truck next to a cab portion of said pick-up truck, a support frame being mounted on said bottom section, said support frame being U-shaped and extending above said base support arms, said bottom section having means to securely receive a top cover comprised of pliant material, said top cover receiving support from said support frame whereby said top cover is projected above said base support arms.

* * * * *